United States Patent
Kuo et al.

(10) Patent No.: US 11,212,434 B2
(45) Date of Patent: Dec. 28, 2021

(54) IMAGE DEVICE AND IMAGE PROCESSING INTEGRATED CIRCUIT

(71) Applicant: Novatek Microelectronics Corp., Hsinchu (TW)

(72) Inventors: Chih-Chia Kuo, Hsinchu (TW); Chao Yung Liu, Hsinchu (TW); Wei-Jen Lo, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/879,771

(22) Filed: May 21, 2020

(65) Prior Publication Data

US 2021/0329166 A1   Oct. 21, 2021

(30) Foreign Application Priority Data

Apr. 15, 2020   (TW) .................... 109204382

(51) Int. Cl.
*H04N 5/232* (2006.01)

(52) U.S. Cl.
CPC ..... *H04N 5/23229* (2013.01); *H04N 5/23216* (2013.01); *H04N 5/232935* (2018.08)

(58) Field of Classification Search
None
See application file for complete search history.

(56) References Cited

U.S. PATENT DOCUMENTS

| | | | |
|---|---|---|---|
| 9,232,125 B2* | 1/2016 | Song | H04N 5/23245 |
| 10,489,878 B2* | 11/2019 | Basso | H04N 5/23232 |
| 2003/0058355 A1* | 3/2003 | Wong | H04N 1/2137 |
| | | | 348/231.99 |
| 2003/0159077 A1* | 8/2003 | Matsuo | G06F 1/3203 |
| | | | 713/300 |
| 2007/0200932 A1* | 8/2007 | Han | H04N 5/23203 |
| | | | 348/207.99 |
| 2011/0025733 A1* | 2/2011 | Im | G09G 3/3426 |
| | | | 345/694 |
| 2011/0058053 A1* | 3/2011 | Roh | H04N 5/232 |
| | | | 348/218.1 |
| 2014/0146187 A1* | 5/2014 | Ju | H04N 19/184 |
| | | | 348/207.1 |
| 2014/0146188 A1* | 5/2014 | Ju | H04N 19/10 |
| | | | 348/207.1 |
| 2017/0118450 A1* | 4/2017 | Jung | H04N 9/09 |
| 2017/0262957 A1* | 9/2017 | Campbell | G06T 3/4015 |
| 2017/0324959 A1* | 11/2017 | Olivier | H04N 19/30 |

(Continued)

*Primary Examiner* — Cynthia Segura
(74) *Attorney, Agent, or Firm* — JCIPRNET

(57) ABSTRACT

An image device and an image processing integrated circuit (IC) of the image device are provided. The image device includes a camera module, a display panel, a central processing IC, and an image processing IC. Based on a control of the central processing IC, the image processing IC decides whether to pre-process an output of the camera module and provide a pre-processed result to the central processing IC, or provide the output of the camera module directly to the central processing IC. Based on the control of the central processing IC, the image processing IC decides whether to post-process an output of the central processing IC and provide a post-processed result to the display panel, or provide the output of the central processing IC directly to the display panel.

17 Claims, 4 Drawing Sheets

(56) References Cited

U.S. PATENT DOCUMENTS

2019/0035048 A1* 1/2019 Hu .......................... G06T 7/97
2019/0251915 A1* 8/2019 Fukuchi .................. G09G 3/36
2020/0167890 A1* 5/2020 Basso ................ G06K 9/00221

* cited by examiner

IMAGE DEVICE AND IMAGE PROCESSING INTEGRATED CIRCUIT

CROSS-REFERENCE TO RELATED APPLICATION

This application claims the priority benefit of Taiwan application serial no. 109204382, filed on Apr. 15, 2020. The entirety of the above-mentioned patent application is hereby incorporated by reference herein and made a part of this specification.

BACKGROUND

Technical Field

The disclosure relates to an electronic circuit and in particular to an image device and an image processing IC thereof.

Description of Related Art

Based on the demands for mobile phone products, system manufacturers may attempt to arrange a customized integrated circuit (IC) at a camera module side to pre-process an output of the camera module and then output a pre-processed result to an application processor (AP). For instance, FIG. 1 is a schematic diagram of a conventional circuit block of an image device 100. The image device 100 shown in FIG. 1 includes a camera module 110, a pre-processing IC 120, an AP 130, and a display panel 140. The pre-processing IC 120 may pre-process an output image of the camera module 110 and then output the pre-processed result to the AP 130. The AP 130 may provide the pre-processed image to the display panel 140. Therefore, the display panel 140 may display the pre-processed output image of the camera module 110.

Besides, based on the demands for mobile phone products, system manufacturers may attempt to arrange a customized IC at a display panel side to post-process an output of the AP and then output a post-processed result to the display panel. For instance, FIG. 2 is a schematic diagram of another conventional circuit block of an image device 200. The image device 200 shown in FIG. 2 includes a camera module 210, an AP 220, a post-processing IC 230, and a display panel 240. The AP 220 may receive the output image of the camera module 210 and transmit the output image of the camera module 210 to the post-processing IC 230. The post-processing IC 230 may post-process the output image of the AP 220 and then output the post-processed result to the display panel 240. Therefore, the display panel 240 may display the post-processed output image of the camera module 210.

The information disclosed in this Background section is only for enhancement of understanding of the background of the described technology and therefore it may contain information that does not form the related art that is already known to a person of ordinary skill in the art. Further, the information disclosed in the Background section does not mean that one or more problems to be resolved by one or more embodiments provided herein was acknowledged by a person of ordinary skill in the art.

SUMMARY

The disclosure provides an image device and an image processing IC thereof to flexibly satisfy design requirements and/or application requirements of the image device.

In an embodiment of the disclosure, the image device includes a camera module, a display panel, a central processing IC, and an image processing IC. A first input pad of the image processing IC is coupled to an output terminal of a camera interface of the camera module. A second input pad of the image processing IC is coupled to an output terminal of a processor interface of the central processing IC. A first output pad of the image processing IC is coupled to an input terminal of the processor interface. A second output pad of the image processing IC is coupled to an input terminal of a display panel interface of the display panel. Based on a control of the central processing IC, the image processing IC determines whether to pre-process an output of the camera module and provide a pre-processed result to the central processing IC or directly provide the output of the camera module to the central processing IC. Based on the control of the central processing IC, the image processing IC decides whether to post-process an output of the central processing IC and provide a post-processed result to the display panel or directly provide the output of the central processing IC to the display panel.

In an embodiment of the disclosure, the image processing IC includes a first input pad, a second input pad, a first output pad, a second output pad, an image processing circuit, a first routing circuit, and a second routing circuit. The image processing circuit is configured to selectively perform at least one of a pre-processing operation and a post-processing operation. A first routing circuit is coupled to the image processing circuit, the first input pad, and the second input pad. The first routing circuit selectively couples the first input pad to at least one of the image processing circuit and a first bypass route, and the first routing circuit selectively couples the second input pad to at least one of the image processing circuit and a second bypass route. A second routing circuit is coupled to the image processing circuit, the first output pad, and the second output pad. The second routing circuit selectively couples the first output pad to at least one of the image processing circuit and the first bypass route, and the second routing circuit selectively couples the second output pad to at least one of the image processing circuit and the second bypass route.

Based on the above, the image processing IC provided in one or more embodiments of the disclosure may decide whether to pre-process the output of the camera module and/or decide whether to post-process the output of the central processing IC. The image processing IC may selectively provide the pre-processed result or the original output of the camera module to the central processing IC, and the image processing IC may selectively provide the post-processed result or the original output of the central processing IC to the display panel. Therefore, the image processing IC can flexibly meet the design requirements and/or application requirements of the image device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
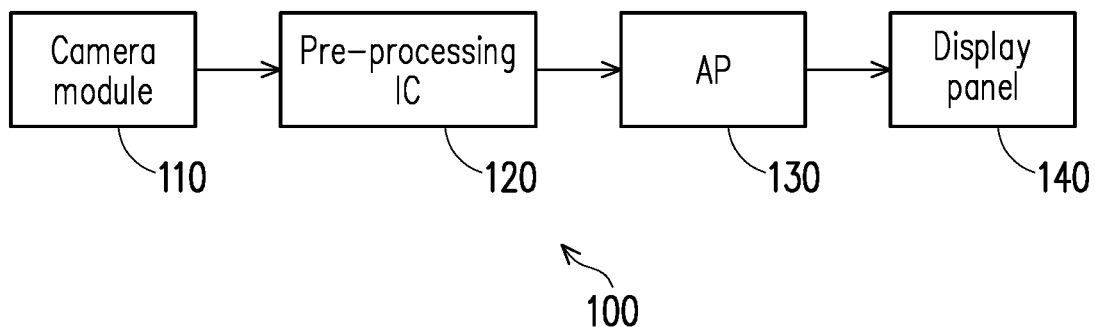
FIG. 1 is a schematic diagram of a conventional circuit block of an image device 100.
Figure 2:
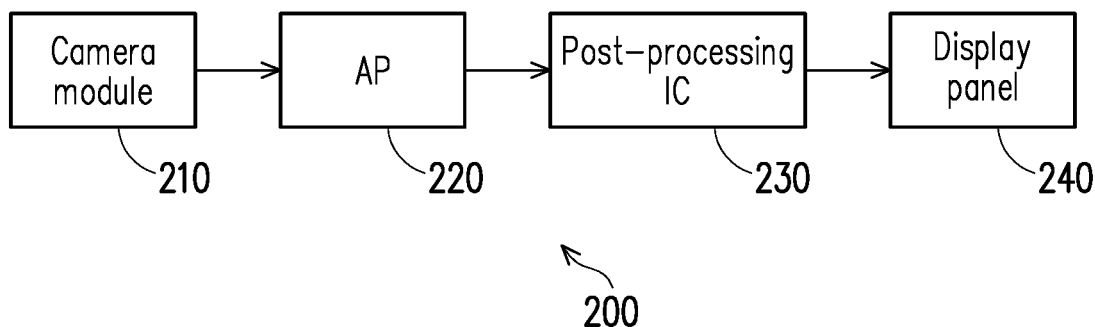
FIG. 2 is a schematic diagram of another conventional circuit block of an image device 200.

The term "coupled (or connected)" herein (including the scope of the patent application) may refer to any direct or indirect means of connection. For instance, if a first device is described as being coupled (or connected) to a second device, it should be interpreted that the first device can be directly connected to the second device, or the first device can be indirectly connected to the second device through other devices or some means of connection. The terms "first" and "second" mentioned herein (including the scope of the patent application) serve to name the elements or make distinction between different embodiments or ranges rather than posing an impact on the order of the elements nor on the upper limit or the lower limit of the number of elements. In addition, wherever possible, elements/components/steps using the same reference numbers in the drawings and embodiments are identical or similar, and the descriptions of the elements/components/steps using the same reference numbers in different embodiments may be cross-referenced.

Figure 3:
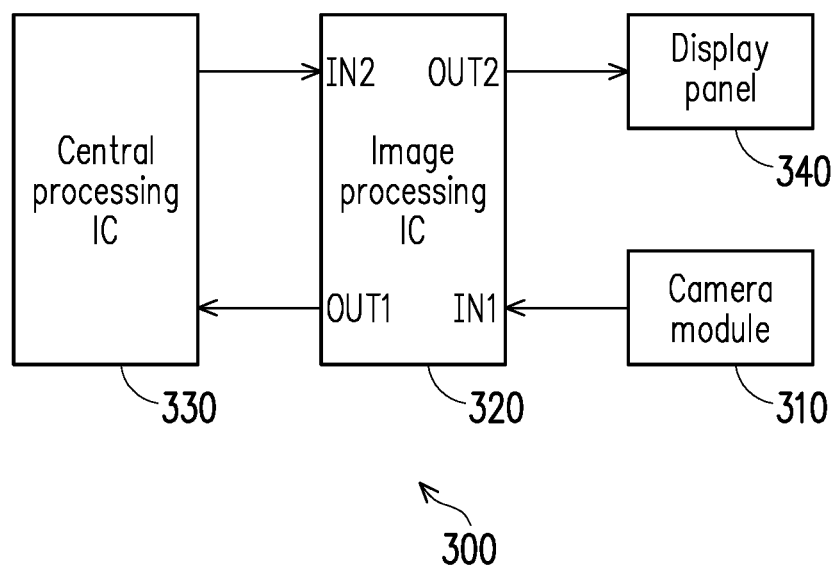
FIG. 3 is a schematic diagram of a circuit block of an image device according to an embodiment of the disclosure.

FIG. 3 is a schematic diagram of a circuit block of an image device 300 according to an embodiment of the disclosure. The image device 300 shown in FIG. 3 includes a camera module 310, an image processing IC 320, a central processing IC 330, and a display panel 340. The image processing IC 320 has an input pad IN1, an input pad IN2, an output pad OUT1, and an output pad OUT2. The input pad IN1 of the image processing IC 320 is adapted to be coupled to an output terminal of a camera interface of the camera module 310. The camera module 310 may transmit an image to the input pad IN1 of the image processing IC 320 through the camera interface. According to the design requirements, in some embodiments, the camera interface may include a mobile industry processor interface (MIPI) or any other data transmission interface.

Based on a control of the central processing IC 330, the image processing IC 320 may decide whether to pre-process an output (an original image) of the camera module 310 to obtain a pre-processed result (a pre-processed image). According to the design requirements, in some embodiments, the pre-processing operation may include noise reduction, multi-frame HDR fusion, local contrast enhancement, and/or any other image pre-processing operation. Here, HDR stands for high dynamic range.

The output pad OUT1 of the image processing IC 320 is coupled to an input terminal of a processor interface of the central processing IC 330. The image processing IC 320 may transmit the image to the central processing IC 330 through the processor interface. According to the design requirements, the central processing IC 330 may include an AP, a central processing unit (CPU), or any other processing IC. According to the design requirements, in some embodiments, the processor interface may include MIPI or any other data transmission interface.

Based on the control of the central processing IC 330, in a certain application scenario, the image processing IC 320 may pre-process the output (the original image) of the camera module 310 and then provide the pre-processed result (the pre-processed image) to the central processing IC 330. Based on the control of the central processing IC 330, in another application scenario, the image processing IC 320 may not perform the pre-processing operation but may directly provide the output (the original image) of the camera module 310 to the central processing IC 330. Therefore, the image processing IC 320 may flexibly meet the design requirements and/or application requirements of the image device 300.

The input pad IN2 of the image processing IC 320 is adapted to be coupled to an output terminal of the processor interface of the central processing IC 330. According to design requirements, in some embodiments, the processor interface may include MIPI or any other data transmission interface. The central processing IC 330 may transmit the image (such as the image output from the output pad OUT1 of the image processing IC 320 or another image) to the input pad IN2 of the image processing IC 320 through the processor interface.

Based on the control of the central processing IC 330, the image processing IC 320 may decide whether to post-process the output (image) of the central processing IC 330. According to the design requirements, in some embodiments, the post-processing operation may include frame rate conversion, sharpness, HDR displaying, and/or any other image post-processing operation.

The output pad OUT2 of the image processing IC 320 is adapted to be coupled to an input terminal of a display panel interface of the display panel 340. According to the design requirements, in some embodiments, the display panel interface may include MIPI or any other data transmission interface. The image processing IC 320 may transmit the image to the display panel 340 through the display panel interface. According to the design requirements, the display panel 340 may include a liquid crystal display panel, a light-emitting diode (LED) display panel, an organic light-emitting diode (OLED) display panel, or any other display panel.

Based on the control of the central processing IC 330, in a certain application scenario, the image processing IC 320 may post-process the output (image) of the central processing IC 330 and then provide the post-processed result (the post-processed image) to the display panel 140. Based on the control of the central processing IC 330, in another application scenario, the image processing IC 320 may not perform the post-processing operation but may directly provide the output (image) of the central processing IC 330 to the display panel 140. Therefore, the image processing IC 320 may flexibly meet the design requirements and/or application requirements of the image device 300.

For instance, in the first application scenario, the image processing IC 320 may perform the pre-processing operation and the post-processing operation. That is, the image processing IC 320 may pre-process the output (the original image) of the camera module 310 and then provide the pre-processed result (the the pre-process image) to the central processing IC 330. At the same time (or in a time division multiplexing manner), the image processing IC 320 may post-process the output (image) of the central processing IC 330 and then provide the post-processed result (the post-processed image) to the display panel 140.

Figure 4:
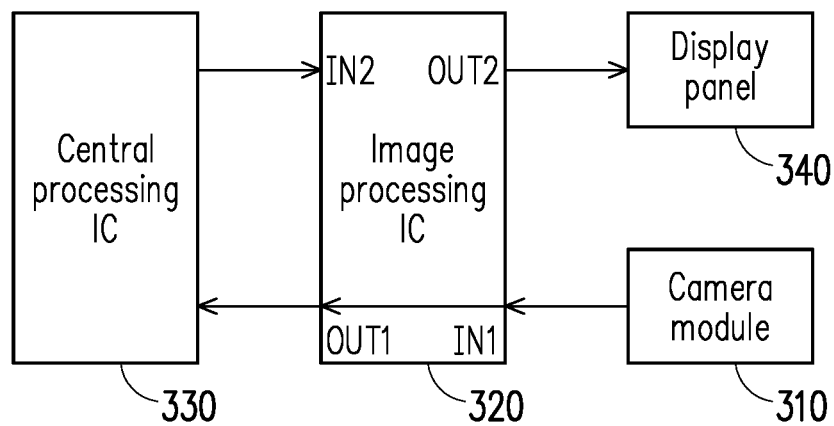
FIG. 4 is a schematic diagram illustrating an operation of the image processing IC shown in FIG. 3 in a second application scenario according to an embodiment of the disclosure.

FIG. 4 is a schematic diagram illustrating an operation of the image processing IC 320 shown in FIG. 3 in a second application scenario according to an embodiment of the disclosure. In the second application scenario shown in FIG. 4, the image processing IC 320 may perform the post-processing operation but does not perform the pre-processing operation. That is, the image processing IC 320 may not directly perform the pre-processing operation but may directly provide the output (the original image) of the camera module 310 to the central processing IC 330. At the same time (or in a time division multiplexing manner), the image processing IC 320 may post-process the output (image) of the central processing IC 330 and then provide the post-processed result (the post-processed image) to the display panel 140.

Figure 5:
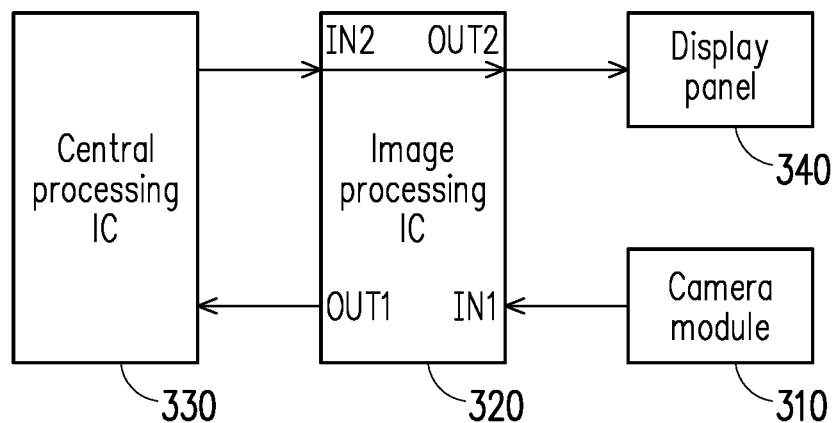
FIG. 5 is a schematic diagram illustrating an operation of the image processing IC shown in FIG. 3 in a third application scenario according to another embodiment of the disclosure.

FIG. 5 is a schematic diagram illustrating an operation of the image processing IC 320 shown in FIG. 3 in a third application scenario according to another embodiment of the disclosure. In the third application scenario shown in FIG. 5, the image processing IC 320 may perform the pre-processing operation but does not perform the post-processing operation. That is, the image processing IC 320 the pre-process the output (the original image) of the camera module 310 and then provide the pre-processed result (the pre-processed image) to the central processing IC 330. At the same time (or in a time division multiplexing manner), the image processing IC 320 may not perform the post-processing operation but may directly provide the output (image) of the central processing IC 330 to the display panel 140.

Figure 6:
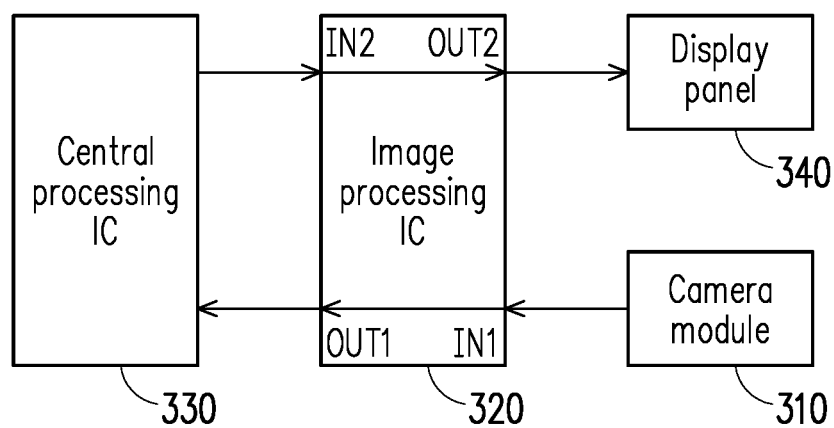
FIG. 6 is a schematic diagram illustrating an operation of the image processing IC shown in FIG. 3 in a fourth application scenario according to another embodiment of the disclosure.

FIG. 6 is a schematic diagram illustrating an operation of the image processing IC 320 shown in FIG. 3 in a fourth application scenario according to another embodiment of the disclosure. In the fourth application scenario shown in FIG. 6, the image processing IC 320 may not perform the pre-processing operation and the post-processing operation to reduce power consumption. That is, the image processing IC 320 may not directly perform the pre-processing operation but may directly provide the output (the original image) of the camera module 310 to the central processing IC 330. At the same time (or in a time division multiplexing manner), the image processing IC 320 may not perform the post-processing operation but may directly provide the output (image) of the central processing IC 330 to the display panel 140.

Figure 7:
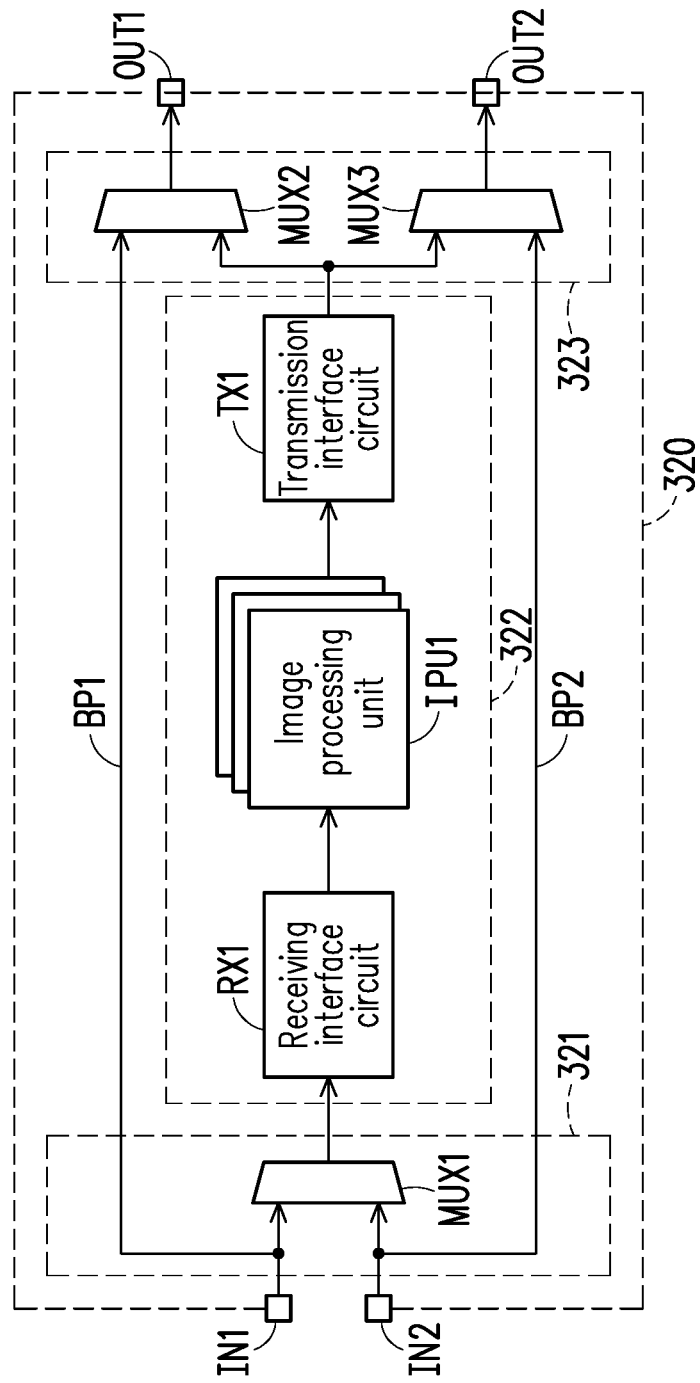
FIG. 7 is a schematic diagram of a circuit block of the image processing IC shown in FIG. 3 according to an embodiment of the disclosure.

FIG. 7 is a schematic diagram of a circuit block of the image processing IC 320 shown in FIG. 3 according to an embodiment of the disclosure. The image processing IC 320 shown in FIG. 7 includes the input pad IN1, the input pad IN2, the output pad OUT1, the output pad OUT2, a routing circuit 321, an image processing circuit 322, and a routing circuit 323. The input pad IN1 is adapted to be coupled to an output terminal of an external element (such as the output terminal of the camera module 310 or another external element). The input pad IN2 is adapted to be coupled to an output terminal of another external element (such as the output terminal of the central processing IC 330 or any other external element). The output pad OUT1 is adapted to be coupled to an input terminal of another external element (such as the input terminal of the central processing IC 330 or any other external element). The output pad OUT2 is adapted to be coupled to an input terminal of another external element (such as the input terminal of the display panel 140 or any other external element).

The routing circuit 321 is coupled to the image processing circuit 322, the input pad IN1, and the input pad IN2. Based on the control of the central processing IC 330, the routing circuit 321 may selectively couple the input pad IN1 to at least one of the image processing circuit 322 and a bypass route BP1. The routing circuit 321 may also selectively couple the input pad IN2 to at least one of the image processing circuit 322 and a bypass route BP2. Based on the control of the central processing IC 330, the image processing circuit 322 may selectively perform the pre-processing operation, the post-processing operation, and/or any other image processing operation on the output (image) of the routing circuit 321. According to the design requirements, in some embodiments, the central processing IC 330 may disable the image processing circuit 322 at certain timing (e.g., in a hibernate mode or in the fourth application scenario) to reduce power consumption. The routing circuit 323 is coupled to the image processing circuit 322, the output pad OUT1, and the output pad OUT2. The routing circuit 323 may selectively couple the output pad OUT1 to at least one of the image processing circuit 322 and the bypass route BP1. The routing circuit 323 may also selectively couple the output pad OUT2 to at least one of the image processing circuit 322 and the bypass route BP2.

For instance, the routing circuit 321 shown in FIG. 7 includes a multiplexer MUX1, the image processing circuit 322 shown in FIG. 7 includes a receiving interface circuit RX1, at least one image processing unit IPU1, and a transmission interface circuit TX1, and the routing circuit 323 shown in FIG. 7 includes a multiplexer MUX2 and a multiplexer MUX3. An output terminal of the multiplexer MUX1 is coupled to an input terminal of the receiving interface circuit RX1. A first input terminal of the multiplexer MUX1 is coupled to the input pad IN1 and the bypass route BP1. A second input terminal of the multiplexer MUX1 is coupled to the input pad IN2 and the bypass route BP2. Based on the control of central processing IC 330, the multiplexer MUX1 may selectively couple one of the input pad IN1 and the input pad IN2 to the input terminal of the receiving interface circuit RX1.

According to the design requirements, in some embodiments, the receiving interface circuit RX1 may be an interface circuit complying with the MIPI standard or any other data transmission standard. The input terminal of the receiving interface circuit RX1 is coupled to the routing circuit 321. The image processing unit IPU1 is coupled to an output terminal of the receiving interface circuit RX1. The image processing unit IPU1 may selectively perform at least one of the pre-processing operation and the post-processing operation. According to the design requirements, in some embodiments, the central processing IC 330 may disable the image processing unit IPU1 at certain timing (e.g., in a hibernate mode or in the fourth application scenario) to reduce power consumption.

An input terminal of the transmission interface circuit TX1 is coupled to the image processing unit IPU1. An output terminal of the transmission interface circuit TX1 is coupled to the routing circuit 323. According to the design requirements, in some embodiments, the transmission interface circuit TX1 may be an interface circuit complying with the MIPI standard or any other data transmission standard.

An output terminal of the multiplexer MUX2 is coupled to the output pad OUT1. A first input terminal of the multiplexer MUX2 is coupled to the output terminal of transmission interface circuit TX1. A second input terminal of the multiplexer MUX2 is coupled to the bypass route BP1. Based on the control of the central processing IC 330, the multiplexer MUX2 may selectively couple one of the bypass route BP1 and the output terminal of the transmission interface circuit TX1 to the output pad OUT1. An output terminal of the multiplexer MUX3 is coupled to the output pad OUT2. A first input terminal of the multiplexer MUX3 is coupled to the output terminal of the transmission interface circuit TX1. A second input terminal of the multiplexer MUX3 is coupled to the bypass route BP2. Based on the control of the central processing IC 330, the multiplexer MUX3 may selectively couple one of the bypass route BP2 and the output terminal of the transmission interface circuit TX1 to the output pad OUT2.

For instance, in the second application scenario shown in FIG. 4, the image processing unit IPU1 shown in FIG. 7 may perform the post-processing operation but not the pre-processing operation. At this time, the multiplexer MUX1 shown in FIG. 7 selects to couple the input pad IN2 to the input terminal of the receiving interface circuit RX1, and the multiplexer MUX2 selects to couple the bypass route BP1 to the output pad OUT1 and couple the output terminal of the transmission interface circuit TX1 to the output pad OUT2. Therefore, the image processing IC 320 may not perform the pre-processing operation but may directly provide the image of the input pad IN1 to the output pad OUT1. At the same time, the image processing IC 320 may post-process the image of the input pad IN2 and then provide the post-processed result (the post-processed image) to the output pad OUT2.

In the third application scenario shown in FIG. 5, the image processing unit IPU1 shown in FIG. 7 may perform the pre-processing operation but not the post-processing operation. At this time, the multiplexer MUX1 shown in FIG. 7 selects to couple the input pad IN1 to the input terminal of the receiving interface circuit RX1, and the multiplexer MUX2 selects to couple the output terminal of the transmission interface circuit TX1 to the output pad OUT1 and selects to couple the bypass route BP2 to the output pad OUT2. Therefore, the image processing IC 320 may pre-process the image of the input pad IN1 and then provide the pre-processed result (the pre-processed image) to the output pad OUT1. At the same time, the image processing IC 320 may not perform the post-processing operation but may directly provide the image of the input pad IN2 to the output pad OUT2.

In the fourth application scenario shown in FIG. 6, the image processing unit IPU1 shown in FIG. 7 may not perform the pre-processing operation and the post-processing operation to reduce power consumption. At this time, multiplexer MUX2 shown in FIG. 7 selects to couple bypass route BP1 to output pad OUT1, and multiplexer MUX2 selects to couple bypass route BP2 to output pad OUT2. Therefore, the image processing IC 320 may not perform the pre-process, but directly provide the image of the input pad IN1 to the output pad OUT1. At the same time, the image processing IC 320 may not perform the post-process but may directly provide the output (image) of the input pad IN2 to the output pad OUT2.

Figure 8:
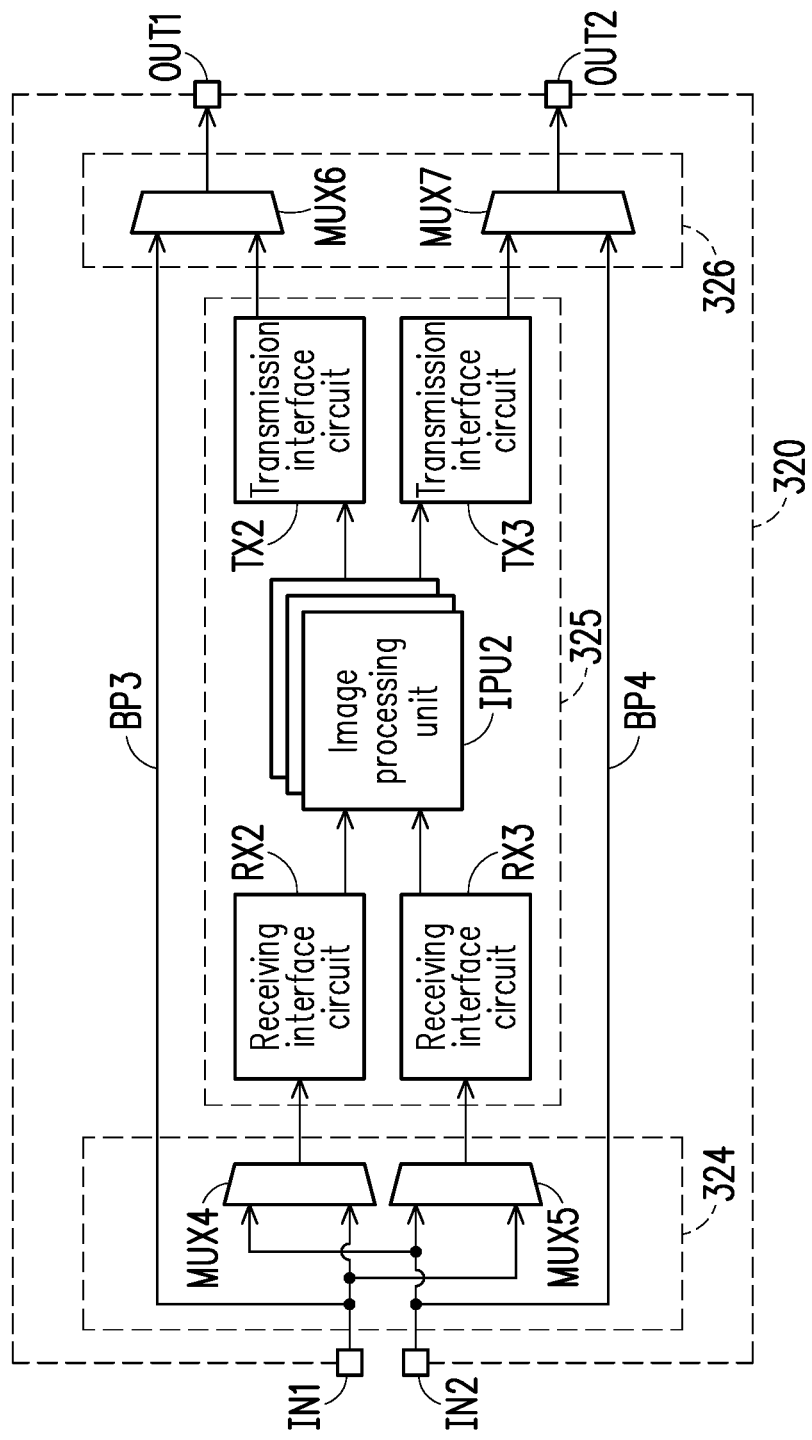
FIG. 8 is a schematic diagram of a circuit block of the image processing IC shown in FIG. 3 according to another embodiment of the disclosure.

FIG. 8 is a schematic diagram of a circuit block of the image processing IC 320 shown in FIG. 3 according to another embodiment of the disclosure. The image processing IC 320 shown in FIG. 8 includes the input pad IN1, the input pad IN2, the output pad OUT1, the output pad OUT2, the routing circuit 324, the image processing circuit 325, and the routing circuit 326. The descriptions of the input pad IN1, the input pad IN2, the output pad OUT1, the output pad OUT2, the routing circuit 324, the image processing circuit 325, and the routing circuit 326 shown in FIG. 8 may be referred to as the relevant descriptions of the input pad IN1, the input pad IN2, the output pad OUT1, the output pad OUT2, the routing circuit 321, the image processing circuit 322, and the routing circuit 323 shown in FIG. 7 and thus will not be repeated hereinafter.

The routing circuit 324 shown in FIG. 8 includes a multiplexer MUX4 and a multiplexer MUX5, the image processing circuit 325 shown in FIG. 8 includes a receiving interface circuit RX2, a receiving interface circuit RX3, at least one image processing unit IPU2, a transmission interface circuit TX2, and a transmission interface circuit TX3, and the routing circuit 326 shown in FIG. 8 includes a multiplexer MUX6 and a multiplexer MUX7. An output terminal of the multiplexer MUX4 is coupled to an input terminal of the receiving interface circuit RX2. A first input terminal of the multiplexer MUX4 is coupled to the input pad IN1 and the bypass route BP3. A second input terminal of the multiplexer MUX4 is coupled to the input pad IN2 and the bypass route BP4. Based on the control of the central processing IC 330, the multiplexer MUX4 may selectively couple one of the input pad IN1 and the input pad IN2 to the input terminal of the receiving interface circuit RX2. An output terminal of the multiplexer MUX5 is coupled to the input terminal of the receiving interface circuit RX3. A first input terminal of the multiplexer MUX5 is coupled to the input pad IN2 and the bypass route BP4. A second input terminal of the multiplexer MUX5 is coupled to the input pad IN1 and the bypass route BP3. Based on the control of the central processing IC 330, the multiplexer MUX5 may selectively couple one of the input pad IN1 and the input pad IN2 to the input terminal of the receiving interface circuit RX3.

According to the design requirements, in some embodiments, the receiving interface circuits RX2 and RX3 may be interface circuits complying with the MIPI standard or any other data transmission standard. The input terminal of the receiving interface circuit RX2 and the input terminal of the receiving interface circuit RX3 are coupled to the routing circuit 324. The image processing unit IPU2 is coupled to the output terminal of the receiving interface circuit RX2 and the output terminal of the receiving interface circuit RX3. The image processing unit IPU2 may selectively perform at least one of the pre-processing operation and the post-processing operation. According to the design requirements, in some embodiments, the central processing IC 330 may disable the image processing unit IPU2 at certain timing (e.g., in a hibernate mode or in the fourth application scenario) to reduce power consumption.

An input terminal of the transmission interface circuit TX2 and an input terminal of the transmission interface circuit TX3 are coupled to the image processing unit IPU2. The explanation of the operation of the image processing unit IPU2 shown in FIG. 8 may be referred to as the relevant descriptions of the image processing unit IPU1 shown in FIG. 7 and thus will not be repeated hereinafter. An output terminal of transmission interface circuit TX2 and an output terminal of transmission interface circuit TX3 are coupled to the routing circuit 326. According to the design requirements, in some embodiments, the transmission interface circuits TX2 and TX3 may be interface circuits complying with the MIPI standard or any other data transmission standard.

An output terminal of the multiplexer MUX6 is coupled to the output pad OUT1. A first input terminal of the multiplexer MUX6 is coupled to the output terminal of the transmission interface circuit TX2. A second input terminal of the multiplexer MUX6 is coupled to the bypass route BP3. Based on the control of the central processing IC 330, the multiplexer MUX6 may selectively couple one of the bypass route BP3 and the output terminal of the transmission interface circuit TX2 to the output pad OUT1. An output terminal of the multiplexer MUX7 is coupled to the output pad OUT2. A first input terminal of the multiplexer MUX7 is coupled to the output terminal of the transmission interface circuit TX3. A second input terminal of the multiplexer MUX7 is coupled to the bypass route BP4. Based on the control of the central processing IC 330, the multiplexer MUX7 may selectively couple one of the bypass route BP4 and the output terminal of the transmission interface circuit TX3 to the output pad OUT2. The explanation of the operation of the multiplexer MUX6 and the multiplexer MUX7 shown in FIG. 8 may be referred to as the relevant descriptions of the multiplexer MUX2 and the multiplexer MUX3 shown in FIG. 7 and thus will not be repeated hereinafter.

For instance, in the first application scenario shown in FIG. 3, the image processing unit IPU2 shown in FIG. 8 may perform the pre-processing operation and the post-processing operation. At this time, the multiplexer MUX4 selects to couple the input pad IN1 to the input terminal of the receiving interface circuit RX2, the multiplexer MUX5 selects to couple the input pad IN2 to the input terminal of the receiving interface circuit RX3, the multiplexer MUX6 selects to couple the output terminal of the transmission interface circuit TX2 to the output pad OUT1, and the multiplexer MUX7 selects to couple the output terminal of the transmission interface circuit TX3 to the output pad OUT2. Therefore, the image processing IC 320 may pre-process the image of the input pad IN1 and then provide the pre-processed result (the pre-processed image) to the output pad OUT1. At the same time, the image processing IC 320 may post-process the image of the input pad IN2 and then provide the post-processed result (the post-processed image) to the output pad OUT2.

According to different design requirements, the blocks of the image processing IC 320, the image processing unit IPU1, and/or the image processing unit IPU2 may be implemented by hardware, firmware, software (program), or a combination of more than one of hardware, firmware, and software (program).

In terms of hardware, the blocks of the image processing IC 320, the image processing unit IPU1, and/or the image processing unit IPU2 may be implemented in form of a logic circuit on an IC. The relevant functions of the image processing IC 320, the image processing unit IPU1, and/or the image processing unit IPU2 may be implemented as hardware by means of a hardware description language (e.g., Verilog HDL or VHDL) or any other appropriate programming language. For instance, the relevant functions of the image processing IC 320, the image processing unit IPU1, and/or the image processing unit IPU2 may be implemented in one or more controllers, microcontrollers, microprocessors, special application ICs (ASIC), digital signal processors (DSPs), field programmable logic gate arrays (FPGA), and/or various logic blocks, modules, and circuits in other processing units.

In terms of software and/or firmware, the relevant functions of the image processing IC 320, the image processing unit IPU1, and/or the image processing unit IPU2 may be implemented as programming codes. For instance, the image processing IC 320, the image processing unit IPU1, and/or the image processing unit IPU2 are implemented by means of a general programming language (such as C, C++, or a combined language) or any other appropriate programming language. The programming codes may be recorded/stored in a recording medium including, for instance, a read only memory (ROM), a storage device, and/or a random access memory (RAM). A computer, a central processing unit (CPU), a controller, a microcontroller, or a microprocessor may read out the programming codes from the recording medium and execute the programming codes to achieve the relevant functions. A "non-transitory computer readable medium" may serve as the recording medium, for instance, a tape, a disk, a card, a semiconductor memory, a programmable logic circuit, and so on. Moreover, the program may be provided to the computer (or CPU) via any transmission medium (e.g., communication network, radio wave, etc.). The communication network is, for instance, Internet, wired communications, wireless communications, or other communication media.

To sum up, the image processing IC 320 provided in one or more embodiments of the disclosure may determine whether to pre-process the output image of the camera module 310 and/or determine whether to post-process the output image of the central processing IC 330. The image processing IC 320 may selectively provide the pre-processed result (the pre-processed image) or the original output (the original image) of the camera module to the central processing IC 330. The image processing IC 320 may also selectively provide the post-processed result (the post-processed image) or the original output of the central processing IC (the image undergoing no post-processing operation) to the display panel. Therefore, the image processing IC 320 may flexibly meet the design requirements and/or application requirements of the image device 300.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image device, comprising:
a camera module;
a display panel;
a central processing integrated circuit; and
an image processing integrated circuit, having a first input pad coupled to an output terminal of a camera interface of the camera module, a second input pad coupled to an output terminal of a processor interface of the central processing integrated circuit, a first output pad coupled to an input terminal of the processor interface, and a second output pad coupled to an input terminal of a display panel interface of the display panel,
wherein the image processing integrated circuit determines whether to perform a pre-processing operation on an output of the camera module based on a control of the central processing integrated circuit and provide a pre-processed result to the central processing integrated circuit or directly provide the output of the camera module to the central processing integrated circuit, and the image processing integrated circuit determines whether to perform a post-processing operation on an output of the central processing integrated circuit based on the control of the central processing integrated circuit and provide a post-processed result to the display panel or directly provide the output of the central processing integrated circuit to the display panel.

2. The image device according to claim 1, wherein the central processing integrated circuit comprises an application processor or a central processing unit.

3. The image device according to claim 1, wherein any of the camera interface, the processor interface, and the display panel interface is a mobile industry processor interface.

4. The image device according to claim 1, wherein the image processing integrated circuit comprises:
an image processing circuit, configured to selectively perform at least one of the pre-processing operation and the post-process operation;
a first routing circuit, coupled to the image processing circuit, the first input pad, and the second input pad, wherein the first routing circuit selectively couples the first input pad to at least one of the image processing circuit and a first bypass route according to the control of the central processing integrated circuit, and the first routing circuit selectively couples the second input pad to at least one of the image processing circuit and a second bypass route according to the control of the central processing integrated circuit; and
a second routing circuit, coupled to the image processing circuit, the first output pad, and the second output pad, wherein the second routing circuit selectively couples the first output pad to at least one of the image processing circuit and the first bypass route according to the control of the central processing integrated circuit, and the second routing circuit selectively couples the second output pad to at least one of the image processing circuit and the second bypass route according to the control of the central processing integrated circuit.

5. The image device according to claim 4, wherein the image processing circuit comprises:
a receiving interface circuit, having an input terminal coupled to the first routing circuit;
at least one image processing unit, coupled to an output terminal of the receiving interface circuit and configured to selectively perform at least one of the pre-processing operation and the post-processing operation; and
a transmission interface circuit, having an input terminal coupled to the at least one image processing unit, wherein an output terminal of the transmission interface circuit is coupled to the second routing circuit.

6. The image device according to claim 5, wherein the first routing circuit comprises:
a multiplexer, having an output terminal coupled to the input terminal of the receiving interface circuit, a first input terminal coupled to the first input pad and the first bypass route, and a second input terminal coupled to the second input pad and the second bypass route.

7. The image device according to claim 5, wherein the second routing circuit comprises:
a first multiplexer, having an output terminal coupled to the first output pad, a first input terminal coupled to the output terminal of the transmission interface circuit, and a second input terminal coupled to the first bypass route; and
a second multiplexer, having an output terminal coupled to the second output pad, a first input terminal coupled to the output terminal of the transmission interface circuit, and a second input terminal coupled to the second bypass route.

8. The image device according to claim 4, wherein the image processing circuit comprises:
a first receiving interface circuit, having an input terminal coupled to the first routing circuit;
a second receiving interface circuit, having an input terminal coupled to the first routing circuit;
at least one image processing unit, coupled to an output terminal of the first receiving interface circuit and an output terminal of the second receiving interface circuit and configured to selectively perform at least one of the pre-processing operation and the post-processing operation;
a first transmission interface circuit, having an input terminal coupled to the at least one image processing unit and an output terminal coupled to the second routing circuit; and
a second transmission interface circuit, having an input terminal coupled to the at least one image processing unit and an output terminal coupled to the second routing circuit.

9. The image device according to claim 8, wherein the first routing circuit comprises:
a first multiplexer, having an output terminal coupled to the input terminal of the first receiving interface circuit, a first input terminal coupled to the first input pad and the first bypass route, and a second input terminal coupled to the second input pad and the second bypass route; and
a second multiplexer, having an output terminal coupled to the input terminal of the second receiving interface circuit, a first input terminal coupled to the second input pad and the second bypass route, and a second input terminal coupled to the first input pad and the first bypass route.

10. The image device according to claim 8, wherein the second routing circuit comprises:
a first multiplexer, having an output terminal coupled to the first output pad, a first input terminal coupled to the output terminal of the first transmission interface circuit, and a second input terminal coupled to the first bypass route; and
a second multiplexer, having an output terminal coupled to the second output pad, a first input terminal coupled to the output terminal of the second transmission interface circuit, and a second input terminal coupled to the second bypass route.

11. An image processing integrated circuit, comprising:
a first input pad;
a second input pad;
a first output pad;
a second output pad;
an image processing circuit, configured to selectively perform at least one of a pre-processing operation and a post-processing operation;
a first routing circuit, coupled to the image processing circuit, the first input pad, and the second input pad, wherein the first routing circuit selectively couples the first input pad to at least one of the image processing circuit and a first bypass route, and the first routing circuit selectively couples the second input pad to at least one of the image processing circuit and a second bypass route; and a second routing circuit, coupled to the image processing circuit, the first output pad, and the second output pad, wherein the second routing circuit selectively couples the first output pad to at least one of the image processing circuit and the first bypass route, and the second routing circuit selectively couples the second output pad to at least one of the image processing circuit and the second bypass route.

12. The image processing integrated circuit according to claim 11, wherein the image processing circuit comprises:
   a receiving interface circuit, having an input terminal coupled to the first routing circuit;
   at least one image processing unit, coupled to an output terminal of the receiving interface circuit and configured to selectively perform at least one of the pre-processing operation and the post-processing operation; and
   a transmission interface circuit, having an input terminal coupled to the at least one image processing unit and an output terminal coupled to the second routing circuit.

13. The image processing integrated circuit according to claim 12, wherein the first routing circuit comprises:
   a multiplexer, having an output terminal coupled to the input terminal of the receiving interface circuit, a first input terminal coupled to the first input pad and the first bypass route, and a second input terminal coupled to the second input pad and the second bypass route.

14. The image processing integrated circuit according to claim 12, wherein the second routing circuit comprises:
   a first multiplexer, having an output terminal coupled to the first output pad, a first input terminal coupled to the output terminal of the transmission interface circuit, and a second input terminal coupled to the first bypass route; and
   a second multiplexer, having an output terminal coupled to the second output pad, a first input terminal coupled to the output terminal of the transmission interface circuit, and a second input terminal coupled to the second bypass route.

15. The image processing integrated circuit according to claim 11, wherein the image processing circuit comprises:
   a first receiving interface circuit, having an input terminal coupled to the first routing circuit;
   a second receiving interface circuit, having an input terminal coupled to the first routing circuit;
   at least one image processing unit, coupled to an output terminal of the first receiving interface circuit and an output terminal of the second receiving interface circuit and configured to selectively perform at least one of the pre-processing operation and the post-processing operation;
   a first transmission interface circuit, having an input terminal coupled to the at least one image processing unit and an output terminal coupled to the second routing circuit; and
   a second transmission interface circuit, having an input terminal coupled to the at least one image processing unit and an output terminal coupled to the second routing circuit.

16. The image processing integrated circuit according to claim 15, wherein the first routing circuit comprises:
   a first multiplexer, having an output terminal coupled to the input terminal of the first receiving interface circuit, a first input terminal coupled to the first input pad and the first bypass route, and a second input terminal coupled to the second input pad and the second bypass route; and
   a second multiplexer, having an output terminal coupled to the input terminal of the second receiving interface circuit, a first input terminal coupled to the second input pad and the second bypass route, and a second input terminal coupled to the first input pad and the first bypass route.

17. The image processing integrated circuit according to claim 15, wherein the second routing circuit comprises:
   a first multiplexer, having an output terminal coupled to the first output pad, a first input terminal coupled to the output terminal of the first transmission interface circuit, and a second input terminal coupled to the first bypass route; and
   a second multiplexer, having an output terminal coupled to the second output pad, a first input terminal coupled to the output terminal of the second transmission interface circuit, and a second input terminal coupled to the second bypass route.

* * * * *